April 13, 1954   J. A. C. C. CLEMINSON ET AL   2,675,456
CONTROL OF ICE ELIMINATION SYSTEMS
Filed May 17, 1951
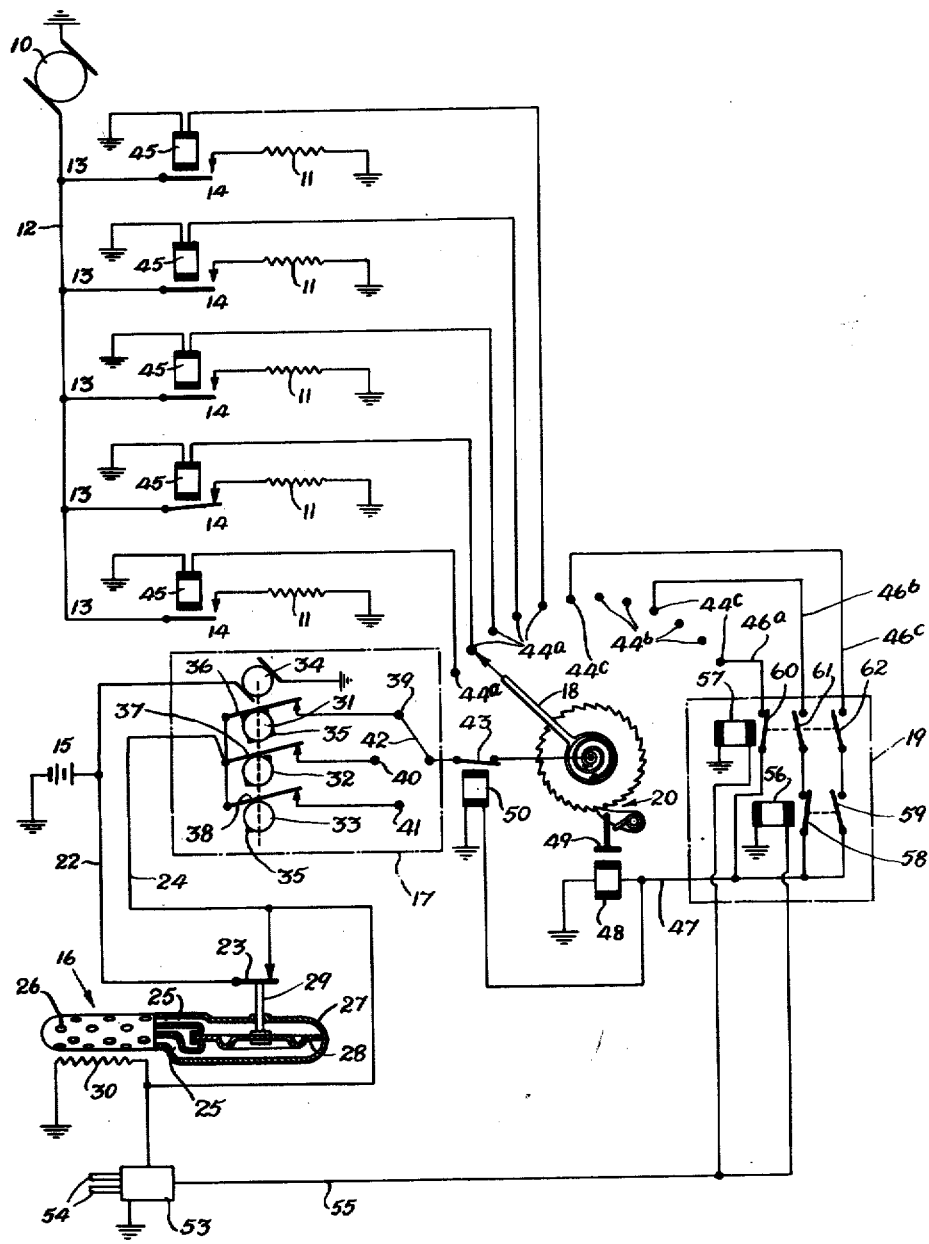
INVENTORS
J.A.C.C.CLEMINSON
G.HAKE
PER
ATTORNEY Patented Apr. 13, 1954

2,675,456

UNITED STATES PATENT OFFICE 2,675,456

CONTROL OF ICE ELIMINATION SYSTEMS

James A. C. C. Cleminson and Guest Hake, Malton, Ontario, Canada, assignors to A. V. Roe Canada Limited, Malton, Peel, Ontario, Canada, a corporation Application May 17, 1951, Serial No. 226,884

8 Claims. (Cl. 219—20)

1

This invention relates to control means for ice elimination systems of aircraft, and more particularly it relates to electrically operated ice elimination systems.

When an aircraft flies through a region containing droplets of supercooled water, the droplets are deposited as ice on vulnerable surfaces such as the leading edges of wings, tail surfaces and propellers. This ice accretion will continue to build up so long as conditions favourable to its formation exist, and since ice increases the weight of an aircraft and destroys the aerodynamic efficiency of the surface to which it is attached, it can rapidly become dangerous unless steps are taken towards its removal.

Various ice elimination systems using electrical heating, pneumatic shedding, and hot gas heating have been developed to deal with this problem; the electrical heating systems, in particular, have proved effective but they require so much power to completely prevent ice formation that their weight is prohibitive for aircraft installations. To reduce the power requirements, it has heretofore been proposed to allow a thin layer of ice to form on the vulnerable surfaces and then to lessen the adhesion of this layer so that the ice is pulled off by the air stream. To loosen the ice, electrical heating elements are provided in appropriate places, and the elements are supplied in succession with high electric current. Since each element is energized only intermittently, the power requirements and the weight of the source of power are greatly reduced.

With this system, however, there is a danger of melting too much of the ice before it is shed, so that the water thus formed runs along the surfaces of the aircraft and re-freezes on portions which are unprotected by heating elements. It is therefore important to control carefully the heating of the elements.

Accordingly it is the main object of this invention to provide an improved control for ice elimination systems.

It is another object of the invention to provide, in an ice elimination system having a plurality of deicing elements, a control for energizing individual elements for a predetermined time and in a predetermined cycle.

The invention will be more clearly understood by reference to the following description of a preferred embodiment thereof, and to the accompanying drawing in which a preferred form of control for an ice elimination system constructed in accordance with the invention is illustrated diagrammatically.

2

The system comprises a primary circuit and a secondary circuit. The primary or heating circuit is fed by a source of power such as a generator 10, and the circuit is constituted by a series of electrical resistance heating elements 11 connected in parallel to a common supply line 12 by leads 13, each of the leads being provided with a normally open relay-actuated switch 14. The return from the heating elements to the generator is through ground.

The secondary or control circuit is fed by a smaller source of power 15, one side of which is grounded, and the circuit includes an ice detection device 16, a timer 17, a stepping switch 18, a selective control 19, and a switch return device generally indicated at 20.

The ungrounded side of the source of power 15 is connected to the timer 17 through a lead 22, a switch 23, and a lead 24. The ice detection device 16 is responsive to ice accretion and automatically switches on the deicing system by closing the switch 23. Many such detection devices have been developed; the one illustrated, which is of conventional form, operates due to a pressure differential. The device comprises two pressure lines 25 leading from intakes indicated at 26 to opposite sides of a pressure capsule 27, the intake for one line being positioned in a region which is highly susceptible to ice accretion while the intake for the other is positioned in a region of similar pressure but which is relatively invulnerable to icing. A diaphragm 28 in the pressure capsule is attached to a slidable rod 29 which operates the switch 23.

When icing conditions are encountered in operation, the ice accretion on the vulnerable portion of the ice detector 16 causes a pressure differential in the capsule 27, displacing the diaphragm 28 and rod 29 and closing the switch 23. A resistance heater 30 is connected between ground and the lead 24 and is associated with the intake which is susceptible to icing. The resistance heater 30 will be energized so long as the switch 23 is closed, and it is designed to dispose of ice accretion on the detector 16 at a rate corresponding to the rate of disposal of ice on the aircraft by the deicing system. When the ice elimination system is no longer required, the pressures on both sides of the diaphragm 28 are equalized, and the switch 23 is opened.

The timer 17 comprises three discs 31, 32 and 33 rotatably mounted on a common shaft and driven by a motor 34. Each disc has a number of radial projections 35 spaced around its periphery, but the number of projections varies from disc to disc. Parallel normally closed switches 36, 37 and 38 are associated with the respective discs, one terminal of each switch being connected to the lead 24, and the other terminals being connected respectively to contacts 39, 40 and 41 of a three position timer control switch 42. The switches 36, 37 and 38 rest against the peripheries of the discs 31, 32 and 33 respectively, and the projections 35 on the discs effect periodic opening of the switches to provide electrical impulses in the secondary circuit. It will be apparent that by altering the position of the switch 42 the frequency of the impulses in the secondary circuit will be varied, although a constant speed motor is used to drive the discs.

The stepping switch 18 is connected in series with any one of the switches 36, 37 and 38 through the three position switch 42 and through a normally closed relay-actuated switch 43. The stepping switch is of conventional form and will be familiar to those skilled in the art. Briefly, it is an electromagnetic device which operates each time an impulse is received from the timer 17, so that the timer may be regarded as the motive means for the switch. The wiper arm of the stepping switch is adapted to traverse a plurality of groups of sequential contacts 44$^a$, 44$^b$ and 44$^c$, and is moved from one contact to another in a clockwise sense each time the switch receives an impulse. The contacts 44$^a$ provide a series of energizing positions for the wiper arm, each contact being connected to ground through a relay 45. Each relay 45, when energized through the wiper arm, closes a switch 14 in the primary circuit, and a deicing element is thereby energized from the generator 10. The contacts 44$^b$ are dummies which are utilized to introduce a time delay into the cycle of operation of the stepping switch, as hereinafter described. The contacts 44$^c$ are connected by linkages 46$^a$, 46$^b$ and 46$^c$ through the selective control 19, to a lead 47 for the relay 48 of the switch return device 20.

The switch return device 20 includes an involute spring which acts in opposition to the force imposed on the arm of the stepping switch, a ratchet wheel mounted coaxially with the stepping switch and fixed thereto so that the two rotate together, and a pawl to which is secured armature 49 of the relay 48, one terminal of which is connected to the lead 47 and the other terminal of which is grounded. A relay 50 is connected in parallel with the relay 48; when energized relay 50 opens the normally closed switch 43.

A device 53 for determining the rate of ice formation operates the selective control 19 and thereby determines which one of the three contacts 44$^c$ is connected to the relays 48 and 50. The device 53 is of conventional construction, and is connected between the lead 24 and ground so that it is supplied with power from the source 15 when the switch 23 is closed. The device includes two probes 54 located in the air stream in a region susceptible to ice accretion. The probes act as the plates of a condenser, and as ice builds up on the probes the dielectric between them changes, thus changing the capacitance of the condenser. In the device 53 is provided an electronic circuit (which does not form part of this invention) which is so constructed and arranged that as the capacitance increases due to ice accretion, the voltage at the output lead 55 decreases proportionally. The output lead is connected to two relays 56 and 57 connected in parallel. When supplied with a predetermined minimum voltage, the relay 56 holds closed a switch 58 in the linkage 46$^b$ and holds open a switch 59 in the linkage 46$^c$. When supplied with a higher minimum voltage, the relay 57 holds closed a switch 60 in the linkage 46$^a$ and holds open switches 61 and 62 in the linkages 46$^b$ and 46$^c$ respectively. Thus when there is little ice on the probes 54 (indicating a relatively low rate of ice formation), a sufficiently high voltage is supplied through the lead 55 to cause relays 56 and 57 to hold in closed position switches 58 and 60 and hold in open position switches 59, 61 and 62; the third contact 44$^c$ (counting in a clockwise sense), is thereby connected through the linkage 46$^a$ to the lead 47, but the other two contacts 44$^c$ are disconnected. As more ice forms on the wires 54, the voltage supplied to the relays gradually falls and the relay 57 eventually opens, opening the switch 60 and closing the switches 61 and 62. Thus, the second contact 44$^c$ is connected through the linkage 46$^b$ to the lead 47, but the first and third contacts 44$^c$ are disconnected. Finally, when still more ice has formed, the voltage falls sufficiently for the relay 56 to open, thus opening the switch 58 and closing the switch 59 so that the first contact 44$^c$ is connetced to the lead 47 and the other contacts 44$^c$ are disconnected.

The operation of the system will now be described. With the switch 23 closed by the ice detection device 16, current flows from the source 15 to the timer 17, the path of the current through the timer being determined by the selected position of the control switch 42. The discs 31, 32 and 33 are rotated by the motor 34 and as these discs rotate the projections 35 on their peripheries force the respective switches 36, 37 and 38 to break contact for a brief interval of time, the number of breaks per revolution of each disc being governed by the number of projections on the disc. With switch 42 in registration with the contact 39 as shown in the drawing, current flows through the switch 36, and the disc 31 controls the frequency of impulses in the secondary circuit. From the switch 36 the pulsating current passes to the contact 39 and thence through the switches 42 and 43 to the stepping switch 18 and its wiper arm.

The impulses from the timer cause the wiper arm of the stepping switch to be driven in a clockwise sense across the series of contacts 44$^a$, 44$^b$ and 44$^c$. Due to the periodic nature of the impulses, the wiper arm dwells on each contact for an appreciable length of time before moving on to the next contact, the duration of dwell being substantially equal to the time interval between successive impulses from the timer. As the arm dwells on each of the contacts 44$^a$ successively, it completes the circuits to successive relays 45 so that the relay-actuated switches 14 are closed in succession. Closing the switches 14 completes the primary circuit to successive heating elements 11 and current flows from the source 10 through the supply line 12 to the heating elements 11, energizing each of them for periods of time corresponding to the intervals between impulses in the secondary circuit.

The contacts 44$^b$ and 44$^c$ and the selective control 19 provide means for introducing a variable time delay at the end of the heating element switching cycle, before the switch return device 20 is conditioned to return the wiper arm back to its initial position on the first of the contacts 44$^a$. In its forward or clockwise movement the wiper arm must travel over some of the contacts 44$^b$ and 44$^c$ until it reaches the particular contact 44ᶜ to which the lead 47 is connected. The circuit is then completed through the relay 48, which becomes energized and attracts the armature 49 of the switch return device 20 thus disengaging the pawl from the teeth of the ratchet wheel and enabling the involute spring to restore the wiper arm of the stepping switch 18 back to its initial position and breaking the circuit to the relay 48 and completing one cycle. The overtravel of the stepping switch beyond the contacts 44ᵃ is determined by which of the contacts 44ᶜ is connected to the relay 48. When little ice is formed on the wires 54, the third contact 44ᶜ is connected to the relay, so that the overtravel of the stepping switch is long and the stepping switch has a long period of cyclic operation. As more ice forms, the second and finally the first contact 44ᶜ may be connected to the relay 51, and the period of switch operation is thereby diminished.

It should be noted that the relay 48 should be so constructed that its magnetic field does not collapse immediately the current is cut off by the return of the wiper arm, but endures long enough to retain the armature 49 until the wiper arm has been returned to its initial position. The relay 50, in parallel with the relay 48, opens the switch 43 while the wiper arm is being returned, thus preventing sparking at the contacts 44ᵃ and also preventing any momentary energization of the relays 45 during the return motion of the arm.

Those skilled in the art will appreciate the advantages of the control system herein described. The system is particularly useful for aircraft installations because of its simplicity, durability, and lightness. The period of a switching cycle can quickly be varied by means of the selective control 19; the duration of energization of the deicing elements 11 is easily controlled by the setting of the switch 42. Because the control or secondary circuit is independent of the heating or primary circuit, light control equipment may be used. The use of a switching unit which has an inherent time delay gives continuity of operation from one cycle to the next, making it unnecessary to use expensive electronic equipment or mechanisms for stopping and re-starting the switching cycle to achieve a time delay. The construction of the timer permits any sequence or frequency of impulses to be generated by the use of appropriate discs 31, 32 and 33.

Many variations of the control system can be effected within the scope of this invention. For example, there are many forms of timer which may be used to provide an impulse in the secondary circuit, and the means herein described for returning the switch to its initial position is only one of various mechanisms which will perform the same function. Moreover, a control system operating on a similar switching cycle can be applied with equal advantage to an installation utilizing pneumatic or hot air deicing equipment. It is to be understood, therefore, that the form of the invention herewith shown and described is to be taken as a preferred example of the same and that various changes may be made without departing from the spirit of the invention or the scope of the subjoined claims.

What we claim as our invention is:

1. In an ice elimination system having a plurality of deicing elements, a cyclically operable switch having a plurality of element energizing positions and a plurality of non-energizing positions, motive means for moving the switch at a controllable rate from position to position in each cycle, switch return means actuated by the switch at one of the non-energizing positions to institute a new cycle, and means for varying the position at which the switch return means is actuated whereby the number of positions to which the switch moves at said rate in a cycle, and thus the period of the cycle, is varied.

2. In an ice elimination system having a plurality of deicing elements, a stepping switch movable to a plurality of element energizing positions for energizing the elements successively in a cycle, the stepping switch having a plurality of non-energizing positions in the cycle and being movable from position at a controllable rate, and switch return means for instituting a new cycle and including a relay selectively connectible to one of the non-energizing positions, the relay when connected to a non-energizing position being actuated when the switch reaches said position, variation of said position thus varying the number of positions to which the switch moves at said rate in a cycle and thus controlling the period of the cycle.

3. In an ice elimination system having a plurality of deicing elements, a stepping switch, motive means for moving the switch from an initial position to a plurality of element energizing positions and to a plurality of non-energizing positions, the stepping switch being movable from position to position at a controllable rate, switch return means for restoring the switch to the initial position and including a relay and a relay-controlled releasable holding means for retaining the switch in the positions to which it is moved, the relay being selectively connectible to one of the non-energizing positions and when connected to a non-energizing position being actuated when the switch is moved to said non-energizing position, thus releasing the holding means whereby the return means restores the switch to the initial position, variation of said non-energizing position thus varying the number of positions to which the switch moves at said rate in a cycle and thus controlling the period of the cycle.

4. In an ice elimination system having a plurality of deicing elements, a cyclically operable stepping switch having in a cycle a plurality of element energizing positions and a plurality of non-energizing positions, a pulse-producing timer in circuit with the switch for stepping the switch from position to position at a controllable rate, switch return means actuated by the switch at one of the non-energizing positions for instituting a new cycle, and means for varying the position at which the switch return means is actuated whereby the number of positions to which the switch moves at said rate in a cycle, and thus the period of the cycle, is varied.

5. In an ice elimination system having a plurality of deicing elements, a cyclically operable stepping switch having in a cycle a plurality of element energizing positions and a plurality of non-energizing positions, motive means for stepping the switch from position to position at a controllable rate, switch return means actuated by the switch at a non-energizing position for instituting a new cycle, and means responsive to the rate of ice formation for varying the non-energizing position at which the return means is actuated whereby the number of positions to which the switch moves at said rate in a cycle, and thus the period of the cycle is varied with the rate of ice formation.

6. In an ice elimination system having a plurality of electrical heating elements and energizing circuits associated therewith, a series of electrical contacts for the energizing circuits, a cyclically operable stepping switch movable over the contacts in succession during a cycle of operation, thereby successively completing the energizing circuits, automatic switch return means for terminating one cycle of operation and initiating the next, and time delay means comprising a further series of contacts traversed by the stepping switch in completing a cycle of operation, means for detecting the rate of ice formation, and a selective control responsive to said detecting means for selectively connecting the automatic return means with one of the said further contacts, the return means being actuated when the stepping switch reaches said one contact.

7. In an ice elimination system having a plurality of deicing elements, a switch, motive means for moving the switch, the switch having an initial position and a plurality of subsequent positions to which it is movable progressively at a controllable rate by the motive means, the positions of the switch including element-energizing positions, return means for returning the switch to the initial position thus interrupting the progressive movement of the switch, the return means being actuated by the switch at one of the positions of the switch, and means for varying the position at which the return means is actuated whereby the number of positions to which the switch moves at said rate in a cycle, and thus the period of the cycle, is varied.

8. In an ice elimination system having a plurality of electrical heating elements and energizing circuits associated therewith, a series of electrical contacts for the energizing circuits, a cyclically operable stepping switch movable at a controllable rate to traverse the contacts in succession during a cycle of operation, thereby successively completing the energizing circuits, a further series of contacts traversed by the stepping switch at said rate in completing a cycle, automatic switch return means actuated by the switch at one of said further contacts for terminating one cycle of operations and initiating the next, and a selective control for varying the contact at which the switch return means is actuated whereby the number of contacts traversed by the switch at said rate in a cycle, and thus the period of the cycle, is varied.

References Cited in the file of this patent

UNITED STATES PATENTS

| Number | Name | Date |
|---|---|---|
| 1,771,273 | Smith | July 22, 1930 |
| 1,775,489 | Gould | Sept. 9, 1930 |
| 2,064,654 | Gannon | Dec. 15, 1936 |
| 2,128,361 | Hunter | Aug. 30, 1938 |
| 2,316,566 | Constable | Apr. 13, 1943 |
| 2,358,406 | Lichtgarn | Sept. 19, 1944 |
| 2,495,792 | Warnick et al. | Jan. 31, 1950 |
| 2,541,512 | Hahn | Feb. 13, 1951 |
| 2,568,700 | Armstrong | Sept. 25, 1951 |
| 2,627,012 | Kinsella et al. | Jan. 27, 1953 |

UNITED STATES PATENT OFFICE

CERTIFICATE OF CORRECTION

Patent No. 2,675,456

April 13, 1954

James A. C. C. Cleminson et al.

It is hereby certified that error appears in the printed specification of the above numbered patent requiring correction and that the said Letters Patent should read as corrected below.

Column 5, line 18, for "relay 51" read -- relay 50 --; column 6, line 15, for "movable from position at a controllable rate" read -- movable from position to position at a controllable rate --.

Signed and sealed this 24th day of December 1957.

(SEAL)
Attest:

KARL H. AXLINE
Attesting Officer

ROBERT C. WATSON
Commissioner of Patents